(12) United States Patent
Yu

(10) Patent No.: US 8,985,797 B2
(45) Date of Patent: Mar. 24, 2015

(54) BACKLIGHT MODULE AND LIQUID CRYSTAL DEVICE

(75) Inventor: Gang Yu, Guangdong (CN)

(73) Assignee: Shenzhen China Star Optoelectronics Technology Co., Ltd., Guangdong (CN)

(*) Notice: Subject to any disclaimer, the term of this patent is extended or adjusted under 35 U.S.C. 154(b) by 360 days.

(21) Appl. No.: 13/636,170

(22) PCT Filed: Jun. 21, 2012

(86) PCT No.: PCT/CN2012/077317
§ 371 (c)(1),
(2), (4) Date: Sep. 20, 2012

(87) PCT Pub. No.: WO2013/185374
PCT Pub. Date: Dec. 19, 2013

(65) Prior Publication Data
US 2013/0335947 A1     Dec. 19, 2013

(30) Foreign Application Priority Data
Jun. 15, 2012 (CN) .......................... 2012 1 0198954

(51) Int. Cl.
*G02F 1/1333* (2006.01)
*G09F 13/04* (2006.01)

(52) U.S. Cl.
CPC ...................... *G09F 13/04* (2013.01)
USPC ............. 362/97.1; 349/58; 362/396; 362/634

(58) Field of Classification Search
CPC .................. G02F 1/133308; G02F 1/133608; G02F 2001/133317; G02F 2201/46; G02F 2201/465; G02F 2001/133314; G02F 2001/133322; G02F 2201/54; G02F 2001/13332; G02F 2202/28; G02F 2001/133354
USPC ............. 349/58, 59, 60; 362/97.1, 97.2, 97.3, 362/97.4, 396, 455, 457, 561, 632, 633, 362/634, 217.1, 217.11, 217.12, 217.13, 362/217.14, 217.15, 217.16, 217.17, 363, 362/367, 368, 374, 233, 234, 235, 236, 237, 362/238, 239, 240, 285, 287, 288, 601, 602
See application file for complete search history.

(56) References Cited
U.S. PATENT DOCUMENTS

2007/0002206 A1* 1/2007 Shirai .............................. 349/58
2009/0310058 A1* 12/2009 Kim et al. ........................ 349/58

* cited by examiner

*Primary Examiner* — Anh Mai
*Assistant Examiner* — Fatima Farokhrooz
(74) *Attorney, Agent, or Firm* — Kirton McConkie; Evan R. Witt

(57) ABSTRACT

The present invention discloses a backlight module comprising a light source; a back plate with side walls; an optical sheet arranged on the back plate and having a plurality of openings on sides thereof; and a plurality of positioning components, each having a suspending portion and a clamping portion; the suspending portion and the opening of the optical sheet are coupled to each other, and the clamping portion and the side wall of the back plate are coupled to each other. The present invention further discloses a liquid crystal display (LCD).

15 Claims, 5 Drawing Sheets

BACKLIGHT MODULE AND LIQUID CRYSTAL DEVICE

FIELD OF THE INVENTION

The present invention relates to the field of liquid crystal display (LCD) technology, and more particularly to a backlight module and a LCD.

BACKGROUND OF THE INVENTION

In a backlight module of the traditional LCD, as shown in FIG. 1, an optical sheet 102 is arranged on a back plate 101 and is positioned thereon by the following method: the back plate 101 has rivets 103 and the optical sheet 102 has openings 104 on corresponding positions; the rivets 103 on the back plate 101 and the openings 104 of the optical sheet 102 are coupled to each other.

In the backlight module, the positioning technical solution for the optical sheet 102 has shortcomings, as follows: (1) It needs to arrange the rivets 103 on the back plate 101; once the positions of the rivets 103 are biased, the rivets 103 could not align with the openings 104 of the optical sheet 102. Thus, the rivets 103 and the openings 104 of the optical sheet 102 cannot couple to each other, resulting in discard of the back plate 101 or the optical sheet 102, and material waste. (2) A success coupling requires that the optical sheet 102 and the back plate 101 match with each other, namely, if the optical sheet 102 wants to be successfully coupled to the back plate 101, the position and size of each rivet 103 on the back plate 101 must be designed according to the position and size of each opening 104 of the optical sheet 102; otherwise, if the back plate 101 wants to be successfully coupled to the optical sheet 102, the position and size of each opening 104 of the optical sheet 102 must be designed according to the position and size of each rivet 103 on the back plate 101. Hence, between different modules, the optical sheet 102 and the back plate 101 are incompatible (not universal).

Therefore, it is necessary to propose a new technique to solve these technical problems.

SUMMARY OF THE INVENTION

One object of the present invention is to provide a backlight module for better positioning of the optical sheet and the back plate so as to simplify the process of the backlight module, and thus provide compatibility of the back plate and the optical sheet between different modules.

To solve these problems, the present invention provides a backlight module comprising: a light source; a back plate with side walls; an optical sheet arranged on the back plate and having a plurality of openings on sides thereof; and a plurality of positioning components, each having a suspending portion and a clamping portion, wherein the suspending portion and the opening of the optical sheet are coupled to each other; the clamping portion and the side wall of the back plate are coupled to each other; wherein the clamping portion comprises a main body and a first bending portion; the main body has an upper end that is connected to the first bending portion; an end of the first bending portion is an extension of the upper end in a first direction; a first predetermined included angle is between the first direction and a line where the main body is located, and the first predetermined included angle is ranged from 30° to 150°; and wherein the suspending portion comprises the main body and a second bending portion; the main body has a lower end that is connected to the second bending portion.

In the backlight module, the end of the first bending portion has a coupling portion that is coupled to the back plate.

In the backlight module, an end of the second bending portion is an extension of the lower end in a second direction; and a second predetermined included angle is between the second direction and the line where the main body is located.

In the backlight module, the first predetermined included angle is ranged from 30° to 150°.

In the backlight module, the opening of the optical sheet and a cross-section at the end of the second bending portion have identical shapes.

Another object of the present invention is to provide a backlight module for better positioning of the optical sheet and the back plate so as to simplify the process of the backlight module, and thus provide compatibility of the back plate and the optical sheet between different modules.

To solve these above problems, the present invention provides a backlight module comprising: a light source; a back plate with side walls; an optical sheet arranged on the back plate and having a plurality of openings on sides thereof; and a plurality of positioning components, each having a suspending portion and a clamping portion, wherein the suspending portion and the opening of the optical sheet are coupled to each other; and the clamping portion and the side wall of the back plate are coupled to each other.

In the backlight module, the clamping portion comprises a main body and a first bending portion; the main body has an upper end that is connected to the first bending portion; an end of the first bending portion is an extension of the upper end in a first direction; a first predetermined included angle is between the first direction and a line where the main body is located, and the first predetermined included angle is ranged from 30° to 150°.

In the backlight module, the end of the first bending portion has a coupling portion that is coupled to the back plate.

In the backlight module, the suspending portion comprises the main body and a second bending portion; the main body has a lower end that is connected to the second bending portion; an end of the second bending portion is an extension of the lower end in a second direction; a second predetermined included angle is between the second direction and the line where the main body is located, and the first predetermined included angle is ranged from 30° to 150°.

In the backlight module, the opening of the optical sheet and a cross-section at the end of the second bending portion have identical shapes.

Another object of the present invention is to provide a backlight module for better positioning of the optical sheet and the back plate so as to simplify the process of the backlight module, and thus provide compatibility of the back plate and the optical sheet between different modules.

To solve these above problems, the present invention provides a LCD comprising: a LCD panel; and a backlight module comprising: a light source; a back plate with side walls; an optical sheet arranged on the back plate and having a plurality of openings on sides thereof; and a plurality of positioning components, each having a suspending portion and a clamping portion, wherein the suspending portion and the opening of the optical sheet are coupled to each other; and the clamping portion and the side wall of the back plate are coupled to each other.

In the LCD, the clamping portion comprises a main body and a first bending portion; the main body has an upper end that is connected to the first bending portion; an end of the first bending portion is an extension of the upper end in a first direction; a first predetermined included angle is between the first direction and a line where the main body is located, and the first predetermined included angle is ranged from 30° to 150°.

In the LCD, the end of the first bending portion has a coupling portion that is coupled to the back plate.

In the LCD, the suspending portion comprises the main body and a second bending portion; the main body has a lower end that is connected to the second bending portion; an end of the second bending portion is an extension of the lower end in a second direction; a second predetermined included angle is between the second direction and the line where the main body is located, and the first predetermined included angle is ranged from 30° to 150°.

In the LCD, the opening of the optical sheet and a cross-section at the end of the second bending portion have identical shapes.

Compared to the traditional technology, the present invention positions the optical sheet by the positioning component, so it does not need to arrange the rivets on the back plate that simplifies the design and process of the back plate; meanwhile, it prevents the optical sheet or the back plate from being discarded due to the mismatch of the position and size of the rivets on the back plate and the openings of the optical sheet in the traditional technology. Besides, the positioning component of the present invention has the suspending portion that is used to couple the opening of the optical sheet for fixing the optical sheet onto the positioning component. The positioning component of the present invention further has the clamping portion, and it couples the side wall of the back plate by the clamping portion, so that the positioning component can move on the side wall. Through coupling at least two positioning components on different sides of the optical sheet to the optical sheet, the positioning of the optical sheet on the back plate can be realized.

Furthermore, in the present invention, if the optical sheet and the positioning component are coupled on the suspending portion of the positioning component, the positions between the optical sheet and the positioning component are relatively fixed; if the clamping portion of the positioning component and the side walls of the back plate are coupled to each other, the positions between the positioning component and the back plate are not fixed. Therefore, according to the actual positions of the openings, the optical sheet can fix onto the back plate by the positioning components. By the positioning components, the back plate and the optical sheet between different modules can be compatible to each other (i.e., universal), which enhances the process flexibility of the backlight module of the LCD.

For the present invention described above will be more apparent, the following specific preferable embodiment with the companying drawings will be elaborated as follows:

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings.

Figure 1:
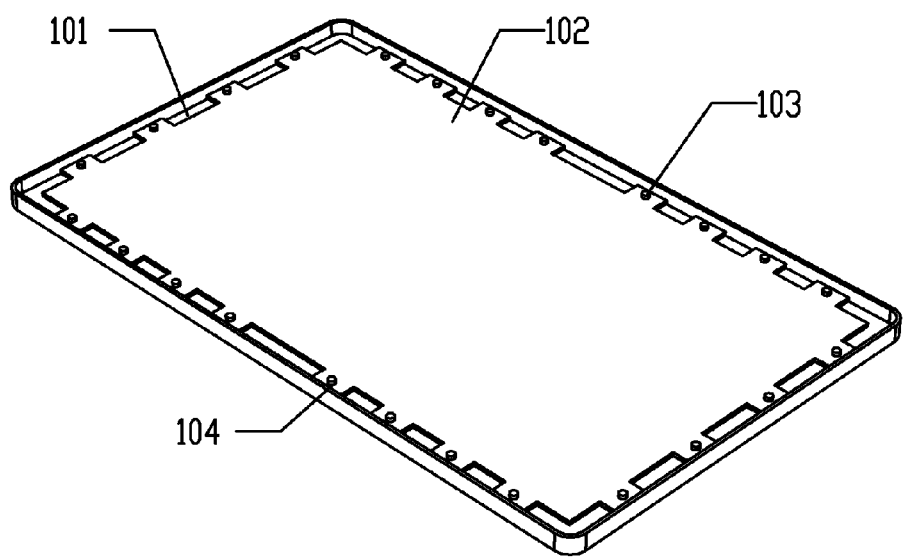
FIG. 1 is a normal axonometric drawing showing a backlight module of the traditional LCD.
Figure 2:
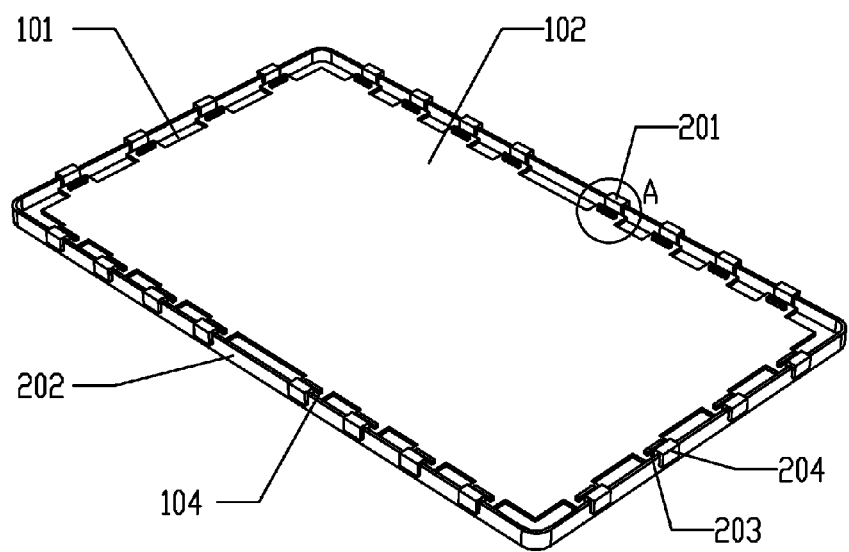
FIG. 2 is a normal axonometric drawing showing a first embodiment of a backlight module of the present invention.
Figure 2A:
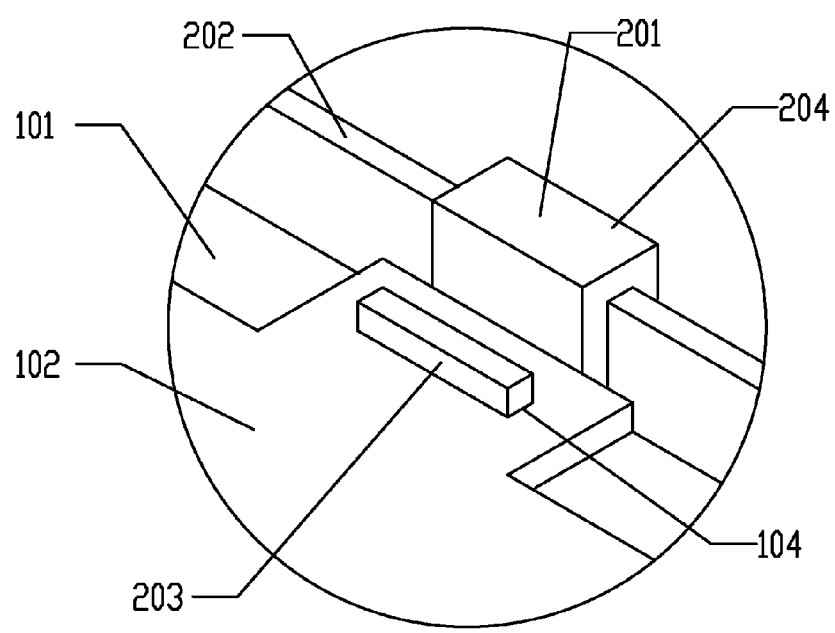
FIG. 2A is a partially enlarged drawing of a region A in FIG. 2.

Please refer to FIG. 2 and FIG. 2A. FIG. 2 is a normal axonometric drawing showing a first embodiment of a backlight module of the present invention, and FIG. 2A is a partially enlarged drawing of a region A in FIG. 2. The backlight module of the present invention comprises a back light 101, a light source (not shown), an optical sheet 102 and a plurality of positioning components 201. The back plate 101 has side walls 202 on sides thereof; the optical sheet 102 is arranged on the back plate 101; the light source is placed under the optical sheet 102; a clamping portion 204 of the positioning component 201 is coupled to a side wall 202 of the back plate 101; the optical sheet 102 has a plurality of openings 104; a suspending portion 203 of the positioning component 201 and the opening 104 of the optical sheet 102 are coupled to each other; the opening 104 of the optical sheet 102 and the cross-section at the end of the suspending portion 203 of the positioning component 201 have identical shapes.

Figure 3:
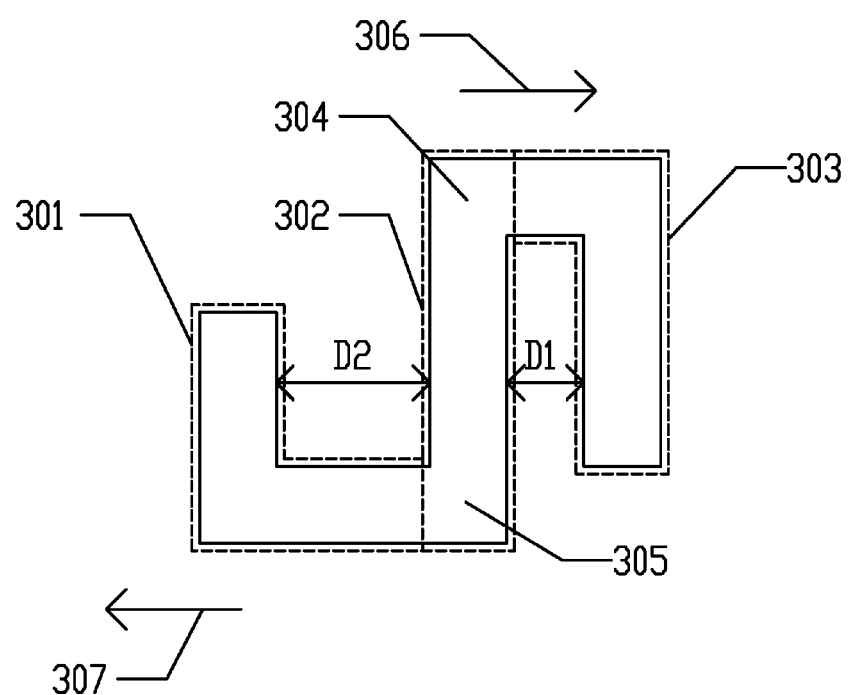
FIG. 3 is a right side view showing the first embodiment of a positioning component in FIG. 2.

Please refer to FIG. 3, a right side view showing the first embodiment of a positioning component in FIG. 2. The positioning component 201 of the present invention comprises the suspending portion 203 and the clamping portion 204. The clamping portion 204 comprises a main body 302 and a first bending portion 303; the main body 302 has an upper end 304 and a lower end 305. The first bending portion 303 is connected to the upper end 304; an end of the first bending portion 303 is an extension of the upper end 304 of the main body 302 in a first direction 306; a first predetermined included angle is between the first direction 306 and a line where the main body 302 is located, i.e., the first predetermined included angle is between the first direction 306 and the connecting-line direction between the upper end 304 and the lower end 305 of the main body 302. The range of the first predetermined included angle is ranged from 30° to 150°, which can be predetermined by the included angle between the side wall 202 and the back plate 101, that is, if the side wall 202 is inclined outward in relation to the back plate 101, assuming the included angle between the back plate 101 and the side wall 202 is 100°, the first predetermined included angle is 100°, and so on. In this embodiment, the side wall 202 is perpendicular to the back plate 101 and the first predetermined angle is a right angle.

The first bending portion 303 is bent downward and the angle thereof ranges from 30° to 150°. In this embodiment, the angle of the first bending portion 303 is a right angle. A first distance D1 is between the downward part of the first bending portion 303 and the main body 302, and the first distance D1 is larger than or equal to the thickness of the side wall 202 of the back plate 101. The first distance D1 is the distance between the relative surfaces of the first bending portion 303 and the main body 302. If the surfaces of the first bending portion 303 and the main body 302 are not parallel, the first distance D1 is the width of the first bending portion 303 that connects the two relative surfaces. The clamping portion 204 and the side wall 202 are coupled to each other.

The suspending portion 203 comprises the main body 302 and the second bending portion 301. The second bending portion 301 is connected to the lower end 305 of the main body 302; an end of the second bending portion 301 is an extension of the lower end 305 of the main body 302 in a second direction 307; a second predetermined included angle is between the second direction 307 and a line where the main body 302 is located, i.e., the second predetermined included angle is between the second direction 307 and the connecting line direction between the upper end 304 and the lower end 305 of the main body 302. The range of the second predetermined included angle is ranged from 30° to 150°, which can be predetermined by the included angle between the side wall 202 and the back plate 101, that is, if the side wall 202 is inclined inward in relation to the back plate 101, assuming the included angle between the back plate 101 and the side wall 202 is 80°, the second predetermined included angle is 80°, and so on. In this embodiment, the side wall 202 is perpendicular to the back plate 101 and the second predetermined angle is a right angle.

The second bending portion 301 is bent upward and the angle thereof ranges from 30° to 150°. In this embodiment, the angle of the second bending portion 301 is a right angle. A second distance D2 is between the upward part of the second bending portion 302 and the main body 302, and the second distance D2 is larger than or equal to the width that encloses the opening 104 and the part which is located on the positioning component 201. The second distance D2 is the distance between the relative surfaces of the second bending portion 301 and the main body 302. If the surfaces of the second bending portion 301 and the main body 302 are not parallel, the second distance D2 is the width of the second bending portion 301 that connects the two relative surfaces. The cross-section at the end of the second bending portion 301 and the cross-section of the opening 104 of the optical sheet 102 have identical shapes. Specifically, the cross-section of the upward part of the second bending portion 301 and the opening 104 of the optical sheet 102 have identical shapes, the upward part of the second bending portion 301 and the opening 104 of the optical sheet 102 are coupled to each other. The included angles of the first direction 306 and the second direction 307 are larger than or equal to 90° or less than or equal to 180°. In this embodiment, the first predetermined included angle is a right angle, and the second predetermined included angle is a right angle as well; the first direction 306 is opposite to the second direction 307.

Figure 4:
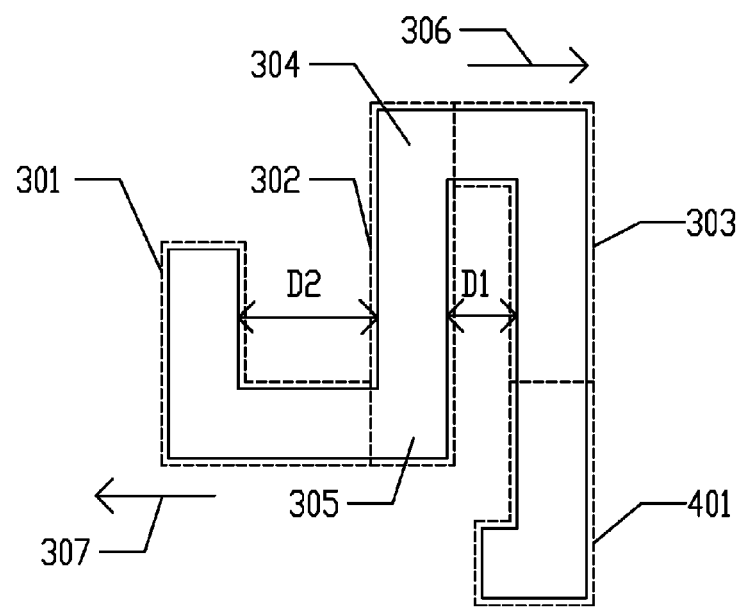
FIG. 4 is a right side view showing a second embodiment of a positioning component in FIG. 2.

As an improvement of the above-mentioned embodiment, the end of the first bending portion 303 of the positioning component 201 can further include a coupling portion 401, as shown in FIG. 4, the coupling portion 401 and the back plate 101 are coupled to each other. Specifically, the coupling portion 401 and the bottom of the back plate 101 are coupled to each other.

The LCD of the present invention comprises a LCD panel and the backlight module, which are superimposed and integrated into one-piece. The backlight module comprises the back plate 101, a light source (not shown), the optical sheet 102 and the positioning component 201, as shown in FIG. 2 and the 2A, wherein the back plate 101 has side walls 202 on sides thereof. the optical sheet 102 is arranged on the back plate 101; the light source is placed under the optical sheet 102; the clamping portion 204 of the positioning component 201 and the opening 104 of the optical sheet 102 are coupled to each other; the opening 104 of the optical sheet 102 and the cross-section at the end of the suspending portion 203 of the positioning component 201 have identical shapes.

The positioning component 201 comprises the suspending portion 203 and the clamping portion 204. As shown in FIG. 3, the clamping portion 204 comprises the main body 302 and the first bending portion 303; the main body 302 includes the upper end 304 and the lower end 305. The first bending portion 303 is connected to the upper end 304 of the main body 302; the end of the first bending portion 303 is an extension of the upper end 304 of the main body 302 in the first direction 306; the first predetermined included angle is between the first direction 306 and the line where the main body 302 is located, i.e., the first predetermined included angle is between the first direction 306 and the connecting-line direction between the upper end 304 and the lower end 305 of the main body 302. The range of the first predetermined included angle is ranged from 30° to 150°, which can be predetermined by the included angle between the side wall 202 and the back plate 101, that is, if the side wall 202 is inclined outward in relation to the back plate 101, assuming the included angle between the back plate 101 and the side wall 202 is 100°, the first predetermined included angle is 100°, and so on. In this embodiment, the side wall 202 is perpendicular to the back plate 101 and the first predetermined angle is a right angle.

The first bending portion 303 is bent downward and the angle thereof ranges from 30° to 150°. In this embodiment, the angle of the first bending portion 303 is a right angle. A first distance D1 is between the downward part of the first bending portion 303 and the main body 302, and the first distance D1 is larger than or equal to the thickness of the side wall 202 of the back plate 101. The first distance D1 is the distance between the relative surfaces of the first bending portion 303 and the main body 302. If the surfaces of the first bending portion 303 and the main body 302 are not parallel, the first distance D1 is the width of the first bending portion 303 that connects the two relative surfaces.

The clamping portion 204 and the side wall 202 are coupled to each other. The suspending portion 203 comprises the main body 302 and the second bending portion 301. The second bending portion 301 is connected to the lower end 305 of the main body 302; the end of the second bending portion 301 is an extension of the lower end 305 of the main body 302 in the second direction 307; the second predetermined included angle is between the second direction 307 and the line where the main body 302 is located, i.e., the second predetermined included angle is between the second direction 307 and the connecting line direction between the upper end 304 and the lower end 305 of the main body 302. The range of the second predetermined included angle is ranged from 30° to 150°, which can be predetermined by the included angle between the side wall 202 and the back plate 101, that is, if the side wall 202 is inclined inward in relation to the back plate 101, assuming the included angle between the back plate 101 and the side wall 202 is 80°, the second predetermined included angle is 80°, and so on. In this embodiment, the side wall 202 is perpendicular to the back plate 101 and the second predetermined angle is a right angle.

The second bending portion 301 is bent upward and the angle thereof ranges from 30° to 150°. In this embodiment, the angle of the second bending portion 301 is a right angle. A second distance D2 is between the upward part of the second bending portion 302 and the main body 302, and the second distance D2 is larger than or equal to the width that encloses the opening 104 and the part which is located on the positioning component 201. The second distance D2 is the distance between the relative surfaces of the second bending portion 301 and the main body 302. If the surfaces of the second bending portion 301 and the main body 302 are not parallel, the second distance D2 is the width of the second bending portion 301 that connects the two relative surfaces.

The cross-section at the end of the second bending portion 301 and the cross-section of the opening 104 of the optical sheet 102 have identical shapes. Specifically, the cross-section of the upward part of the second bending portion 301 and the opening 104 of the optical sheet 102 have identical shapes, the upward part of the second bending portion 301 and the opening 104 of the optical sheet 102 are coupled to each other. The included angles of the first direction 306 and the second direction 307 are larger than or equal to 90° or less than or equal to 180°. In this embodiment, the first predetermined included angle is a right angle, and the second predetermined included angle is a right angle as well; the first direction 306 is opposite to the second direction 307. As a improvement of the above-mentioned embodiment, the end of the first bending portion 303 of the positioning component 201 can further include a coupling portion 401, as shown in FIG. 4, the coupling portion 401 and the back plate 101 are coupled to each other. Specifically, the coupling portion 401 and the bottom of the back plate 101 are coupled to each other.

In the present invention, the optical sheet 102 is positioned by the positioning component 201, so it does not need to arrange the rivets 103 on the back plate 101 that simplifies the design and process of the back plate 101; meanwhile, it prevents the optical sheet 102 or the back plate 101 from being discarded due to the mismatch of the position and size of the rivets 103 on the back plate 101 and the openings 104 of the optical sheet 102 in the traditional technology. Besides, the positioning component 201 of the present invention has the suspending portion 203 that is used to couple the opening 104 of the optical sheet 102 for fixing the optical sheet 102 onto the positioning component 201. The positioning component 201 of the present invention further has the clamping portion 204, and it couples the side wall 202 of the back plate 101 by the clamping portion 204, so that the positioning component 201 can move on the side wall 202. Through coupling at least two positioning components 201 on different sides of the optical sheet 102 to the optical sheet 102, the positioning of the optical sheet 102 on the back plate 101 can be realized.

Furthermore, in the present invention, if the optical sheet 102 and the positioning component 201 are coupled on the suspending portion 203 of the positioning component 201, the positions between the optical sheet 102 and the positioning component 201 are relatively fixed; if the clamping portion 204 of the positioning component 201 and the side walls 202 of the back plate 101 are coupled to each other, the positions between the positioning component 201 and the back plate 101 are not fixed. Therefore, according to the actual positions of the openings 104, the optical sheet 102 can fix onto the back plate 101 by the positioning components 201. By the positioning components 201, the back plate 101 and the optical sheet 102 between different modules can be compatible to each other (i.e. universal), which enhances the process flexibility of the backlight module of the LCD.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A backlight module, comprising:
a light source;
a back plate with side walls;
an optical sheet arranged on the back plate and having a plurality of openings on sides thereof; and
a plurality of positioning components, each having a suspending portion and a clamping portion, wherein the suspending portion and the opening of the optical sheet are coupled to each other; and the clamping portion and the side wall of the back plate are coupled to each other;
wherein the clamping portion comprises a main body and a first bending portion; the main body has an upper end that is connected to the first bending portion; an end of the first bending portion is an extension of the upper end in a first direction; a first predetermined included angle is between the first direction and a line where the main body is located, and the first predetermined included angle is ranged from 30° to 150°;
and
wherein the suspending portion comprises the main body and a second bending portion; and the main body has a lower end that is connected to the second bending portion.

2. The backlight module according to claim 1, wherein the end of the first bending portion has a coupling portion that is coupled to the back plate.

3. The backlight module according to claim 2, wherein an end of the second bending portion is an extension of the lower end in a second direction; and a second predetermined included angle is between the second direction and the line where the main body is located.

4. The backlight module according to claim 3, wherein the second predetermined included angle is ranged from 30° to 150°.

5. The backlight module according to claim 4, wherein the opening of the optical sheet and a cross-section at the end of the second bending portion have identical shapes.

6. A backlight module, comprising:
a light source;
a back plate with side walls;
an optical sheet arranged on the back plate and having a plurality of openings on sides thereof; and
a plurality of positioning components, each having a suspending portion and a clamping portion, wherein the suspending portion and the opening of the optical sheet are coupled to each other; and the clamping portion and the side wall of the back plate are coupled to each other.

7. The backlight module according to claim 6, wherein the clamping portion comprises a main body and a first bending portion; the main body has an upper end that is connected to the first bending portion; an end of the first bending portion is an extension of the upper end in a first direction; a first predetermined included angle is between the first direction and a line where the main body is located, and the first predetermined included angle is ranged from 30° to 150°.

8. The backlight module according to claim 7, wherein the end of the first bending portion has a coupling portion that is coupled to the back plate.

9. The backlight module according to claim 6, wherein the suspending portion comprises the main body and a second bending portion; the main body has a lower end that is connected to the second bending portion; an end of the second bending portion is an extension of the lower end in a second direction; a second predetermined included angle is between the second direction and the line where the main body is located, and the second predetermined included angle is ranged from 30° to 150°.

10. The backlight module according to claim 9, wherein the opening of the optical sheet and a cross-section at the end of the second bending portion have identical shapes.

11. A liquid crystal display (LCD), comprising:
a LCD panel; and
a backlight module comprising:
a light source;
a back plate with side walls;
an optical sheet arranged on the back plate and having a plurality of openings on sides thereof; and
a plurality of positioning components, each having a suspending portion and a clamping portion, wherein the suspending portion and the opening of the optical sheet are coupled to each other; and the clamping portion and the side wall of the back plate are coupled to each other.

12. The LCD according to claim 11, wherein the clamping portion comprises a main body and a first bending portion; the main body has an upper end that is connected to the first bending portion; an end of the first bending portion is an extension of the upper end in a first direction; a first predetermined included angle is between the first direction and a line where the main body is located, and the first predetermined included angle is ranged from 30° to 150°.

13. The LCD according to claim 12, wherein the end of the first bending portion has a coupling portion that is coupled to the back plate.

14. The LCD according to claim 11, wherein the suspending portion comprises the main body and a second bending portion; the main body has a lower end that is connected to the second bending portion; an end of the second bending portion is an extension of the lower end in a second direction; a second predetermined included angle is between the second direction and the line where the main body is located, and the second predetermined included angle is ranged from 30° to 150°.

15. The LCD according to claim 14, wherein the opening of the optical sheet and the cross-section at the end of the second bending portion have identical shapes.

\* \* \* \* \*